Patented Aug. 7, 1945

2,381,720

UNITED STATES PATENT OFFICE 2,381,720

RUBBERLIKE COMPOSITIONS

Charles F. Brown, Grosse Pointe Park, Mich., assignor to United States Rubber Company, New York, N. Y., a corporation of New Jersey No Drawing. Application February 13, 1943, Serial No. 475,793

4 Claims. (Cl. 260—87)

The invention relates to new rubber-like compositions derived from partially hydrolyzed polyvinyl esters, and more particularly from partially hydrolyzed polyvinyl acetate.

An object of the invention is to produce compositions from partially hydrolyzed polyvinyl esters, i. e., partially hydrolyzed polymers of a polymerizable ester of a carboxylic acid, which compositions are thermosetting, elastic, resistant to solvents, and which resemble ordinary vulcanized rubber in their general properties. A further object is to provide compositions having properties analogous to vulcanized soft or hard rubber compositions which are resistant to oxidation, which are not deteriorated by light, and which undergo none of the ageing characteristics of vulcanized rubbers. Other objects will be apparent from the following description.

Broadly, the composition comprises the heat-conversion product of a mix of a partially hydrolyzed polyvinyl ester resin, such as partially hydrolyzed polyvinyl acetate, an inorganic oxidizing agent, and an organic oxidizing agent.

The organic oxidizing agents are characterized as those which are capable of vulcanizing ordinary rubber in the absence of sulphur, and are preferably selected from the aromatic halogen-containing compounds. Among them are the halogenated quinones (as described in Fisher U. S. Patent No. 1,918,328), particularly tetrachlorquinone (chloranil), picryl chloride, pentachlorophenol, chloroacetanilide, etc. These materials may be termed the primary oxidizing agents of the invention, and may be varied, by weight, from 1 to 20 parts per 100 parts of the polyvinyl resin.

Various inorganic oxidizing agents may be used such as lead chromate, sodium chromate, potassium permanganate, lead peroxide, yellow mercuric oxide, etc. These materials may be termed the secondary oxidizing agents or "accelerators" in the present invention, and may be varied, by weight, from 4 to 64 parts per 100 parts of the polyvinyl resin. The preferred combination of oxidizing agents is lead chromate about 16 parts and tetrachlorquinone about 4 parts, per 100 parts of the polyvinyl resin.

In addition to the above described materials the compositions may contain any suitable plasticizers, fillers, or other ingredients, which make for improvement in the product. Generally, fillers suitable for use in cured rubber compositions are applicable in the present invention.

In a preferred modification of the invention the composition comprises, in addition to the above ingredients, a filler such as carbon black, preferably channel black, which has superior action on the tensile of the cured composition, an amine such as phenyl-beta naphthylamine, and a plasticizer from the class of polyhydric alcohols or their derivatives such as glycerol, triethylene glycol, triacetin, etc. In a further modification to either the first described composition or the second described composition, there may be added a tack-producing agent, such as an alkyd resin, phenol-aldehyde resin, or the like.

The use of amines that are water-insoluble are preferred, such as phenyl-beta naphthylamine, although water-soluble amines such as triethanolamine may be used. The chief functions of these materials of the present invention are as aids in processing and in increasing the tensile strength of the finished product.

The plasticizers that are applicable are generally polyhydric alcohols such as glycerol, or ethylene glycols, or their derivatives, amides such as acetamide or its derivatives, amines such as mono, di, or triethanolamines or derivatives thereof.

The tack-producing agents which are preferred, belong to the class of Glyptal resins that do not become friable in the "C" or complete polymerization stage; the same conditions apply to other types of resins, natural or synthetic, that are used as tack-producing agents.

The partially hydrolyzed polyvinyl ester resin that may be used may be varied from 50% to 90% hydrolyzed. The best results are obtained from the grades where 50% of the polyvinyl acetate residues have been substituted to form hydroxyl groups in the polymer, for example in the case of partially hydrolyzed polyvinyl acetate the 50% would correspond to the polyvinyl alcohol part of the polymer molecule or aggregate. Physical mixtures of polyvinyl acetate and polyvinyl alcohol as separate entities have not been found satisfactory in the present invention.

The proportions of the ingredients in the composition may be varied over a rather wide range to give useful compositions, the properties of the final products depending on the character and extent of the ingredient varied. For example, the lead chromate may be varied from 4 to 64 parts and the tetrachlorquinone from 1 to 20 parts per 100 parts of the polyvinyl resin. Properties of the material vary, as for soft to hard rubber vulcanized compositions.

The wide variations apply to the other ingredients such as fillers, plasticizers, resins, etc., used in the compositions.

The general method for practice of the invention is illustrated as follows: 50% hydrolyzed polyvinyl acetate is placed in an equal weight of methanol and the resin permitted to swell. The required amount of plasticizer is added to the mix and stirred. After a few hours standing, the methanol is evaporated and the plasticized product put on a conventional rubber mill. The plasticizer may also be added to the resin on the mill or in a suitable mixer but the time for homogenizing is longer by this method. The temperature of the rolls is so adjusted as to give a working sheet of the composition. The filler is now added and well dispersed. Next comes the lead chromate, then more plasticizer, if necessary, then the amine and/or other processing agents, followed by the curing component viz: tetrachlorquinone. The temperature of the composition on the working rolls must not be permitted to rise too high or incipient curing or scorching, will occur. The tack-producing agent is usually added last and the mixture processed according to the art of rubber mixing. The temperature of cure may range from about 212° F. to about 320° F.

A few specific examples illustrating the effects of ingredients in the invention follow, the parts being by weight:

|  | A | B | C | D | E | F |
|---|---|---|---|---|---|---|
| Resin 50% hydrolyzed | 60 | 60 | 60 | 60 | 60 | 80 |
| Glycerol | 20 | 20 | 20 | 20 | 20 |  |
| Triethylene glycol | 20 | 20 | 20 | 20 | 20 |  |
| Glyceryl monohydroxy acetate |  |  |  |  |  | 20 |
| Carbon black | 5 | 5 | 5 | 5 | 20 | 20 |
| Phenyl-beta naphthylamine | 5 | 5 | 5 | 5 | 5 | 5 |
| Lead chromate |  | 16 |  | 16 | 16 | 16 |
| Tetrachlorquinone |  |  | 4 | 4 | 4 | 4 |
| Tensile, lbs./sq. in | 200 | 325 | 150 | 800 | 1,600 | 4,215 |
| Elongation | 500 | 525 | 970 | 300 | 360 | 200 |
| Shore A durometer | 34 | 34 | 28 | 38 | 53 | 89 |

Samples were mixed as described in the practice of the invention, and cured in conventional rubber molds heated between platens at a temperature of 290° F. for 30 minutes. Examples A, B, and C exhibited no evidence of cure, were thermoplastic, and had to be cooled before removal from the mold could be effected. Examples D, E, and F were cured, non-thermoplastic, and could be removed from the mold at the curing temperature without any evidence of distortion of the piece. The D and E samples resembled soft vulcanized rubber, while F resembled hard vulcanized rubber. Curing temperatures and length of curing time may be varied over a wide range.

B and C illustrate that the basic curing ingredients used singly does not materially change the characteristics of the original resin composition. Example D illustrates the novel effect of a combination of these materials. Example E illustrates the effect of increased content of reinforcing agents such as channel black. Example F illustrates the effect of changing plasticizer and plasticizer content.

Further modifications of the invention are illustrated in the following examples:

|  | G | H | I | J | K |
|---|---|---|---|---|---|
| Resin 50% hydrolyzed | 60 | 60 | 60 | 60 | 60 |
| Glycerol | 20 | 20 | 20 | 20 | 20 |
| Triethylene glycol | 20 | 20 | 20 | 20 | 20 |
| Carbon black | 20 | 20 | 20 | 20 | 20 |
| Phenyl-beta naphthylamine | 5 |  |  |  | 5 |
| Triethanolamine |  | 5 |  |  |  |
| Barium chromate |  |  | 3 | 3 |  |
| Sodium chromate | 12 |  |  |  |  |
| Lead chromate |  | 8 |  |  |  |
| Tetrachlorquinone | 4 | 4 | 16 | 16 | 16 |
| Picryl chloride |  |  | 4 |  |  |
| Quinone |  |  |  | 4 |  |
| Tensile, lbs./sq. in | 1,000 | 1,000 | 1,220 | 900 | 225 |
| Elongation | 275 | 160 | 320 | 300 | 525 |
| Shore A durometer | 49 | 57 | 52 | 43 | 28 |

Examples G and H illustrate the use of various inorganic oxidizing agents other than lead chromate. Example I illustrates the use of a water-soluble amine instead of a water-insoluble amine. Example J illustrates another curing agent other than tetrachlorquinone while Example K illustrates the use of compounds whose chemical nucleus resembles those used in the present invention. Example K did not cure and had to be cooled before removal from the mold could be effected.

The compositions may be used in place of or in conjunction with other rubbers from natural or synthetic origin. Such instances are in molded composite articles such as tubing, belts, tires, wearing apparel, grommets, etc.

While I have herein disclosed with particularity certain preferred manners of performing my invention, I do not desire to limit myself solely thereto, because the precise proportions of the materials utilized can be varied without departing from the spirit and scope of the invention as defined in the appended claims.

Having thus described my invention, what I claim and desire to protect by Letters Patent is:

1. A rubber substitute which is the heat-conversion product of a composition comprising a partially hydrolyzed polyvinyl ester which is from 50 to 90 percent hydrolyzed, an inorganic oxidizing agent containing oxygen and a multivalent metal, and an aromatic halogen-containing oxidizing agent selected from the class consisting of picryl chloride, pentachlorophenol, chloroacetanilide, and tetrachlorquinone.

2. A rubber substitute which is the heat-conversion product of a composition comprising a partially hydrolyzed polyvinyl acetate which is from 50 to 90 percent hydrolyzed, an inorganic oxidizing agent containing oxygen and a multivalent metal, and an aromatic halogen-containing oxidizing agent selected from the class consisting of picryl chloride, pentachlorophenol, chloroacetanilide, and tetrachlorquinone.

3. An elastic rubber substitute which is the heat-conversion product of a composition comprising a partially hydrolyzed polyvinyl acetate which is from 50 to 90 percent hydrolyzed, lead chromate, and tetrachlorquinone.

4. An elastic rubber substitute which is the heat-conversion product of a composition comprising a partially hydrolyzed polyvinyl acetate which is from 50 to 90 percent hydrolyzed, lead chromate, tetrachlorquinone, an organic amine, and carbon black.

CHARLES F. BROWN.